United States Patent [19]

Nishimura

[11] Patent Number: 5,208,677

[45] Date of Patent: May 4, 1993

[54] VIDEO SIGNAL REPRODUCING APPARATUS

[75] Inventor: Hajime Nishimura, Tokyo, Japan

[73] Assignee: Sony Corporation, Tokyo, Japan

[21] Appl. No.: 748,455

[22] Filed: Aug. 22, 1991

[30] Foreign Application Priority Data

Aug. 29, 1990 [JP] Japan .................. 2-225292

[51] Int. Cl.⁵ .................. H04N 5/783; H04N 5/94
[52] U.S. Cl. .................. 358/335; 358/312; 358/336; 360/10.1; 360/10.3; 360/38.1
[58] Field of Search ............ 358/335, 336, 337, 312, 358/313, 167, 317, 340, 328; 360/10.1, 10.3, 38.1, 36.1, 36.2

[56] References Cited

U.S. PATENT DOCUMENTS

| | | | |
|---|---|---|---|
| 4,199,780 | 4/1980 | Taylor | 360/38.1 |
| 4,597,020 | 6/1986 | Wilkinson | 360/10.3 |
| 4,943,858 | 7/1990 | Kitaura | 358/336 |

Primary Examiner—Tommy P. Chin
Assistant Examiner—Huy Nguyen
Attorney, Agent, or Firm—William S. Frommer; Alvin Sinderbrand

[57] ABSTRACT

A video signal reproducing apparatus plays back at a high speed a recorded signal recorded on a recording medium, eliminating noise bars in the reproduced image by replacing a noise portion, that is, a signal portion reproduced by a magnetic head having a different azimuth from the azimuth of a track on the recording medium, with a corresponding signal portion of a previously reproduced track having the same azimuth as the magnetic head. The recorded signal is a shuffled video signal having mutually adjacent lines of one field recorded on different tracks of the recording medium in a predetermined sequence. Then the apparatus deshuffles the reproduced signal devoid of noise bars to obtain a deshuffled video signal.

6 Claims, 14 Drawing Sheets

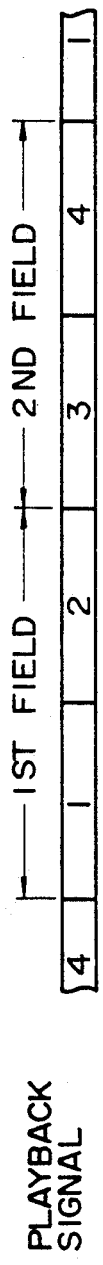
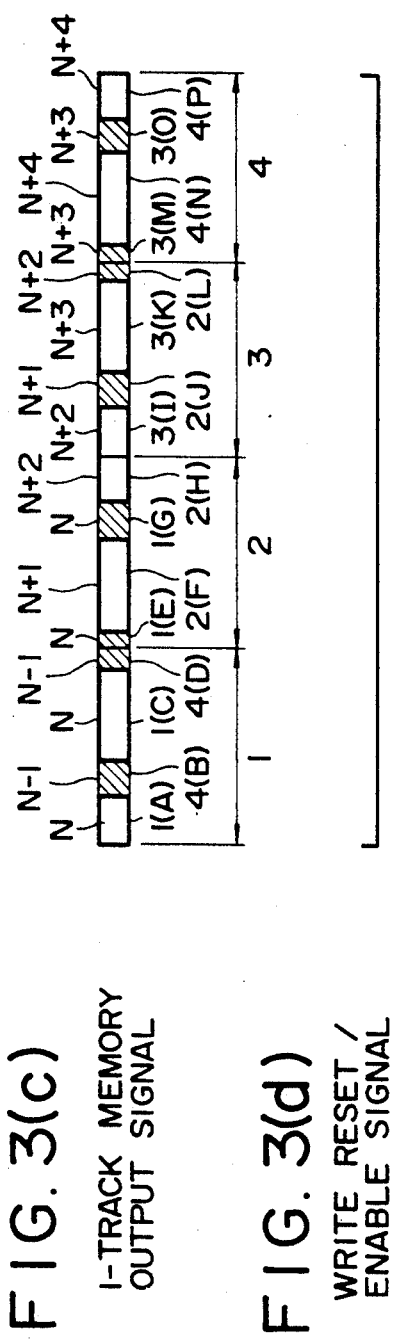
FIG. 3(a) PLAYBACK SIGNAL
FIG. 3(b) WRITE RESET/ENABLE SIGNAL
FIG. 3(c) 1-TRACK MEMORY OUTPUT SIGNAL
FIG. 3(d) WRITE RESET/ENABLE SIGNAL
FIG. 3(e) 1-FRAME MEMORY OUTPUT SIGNAL

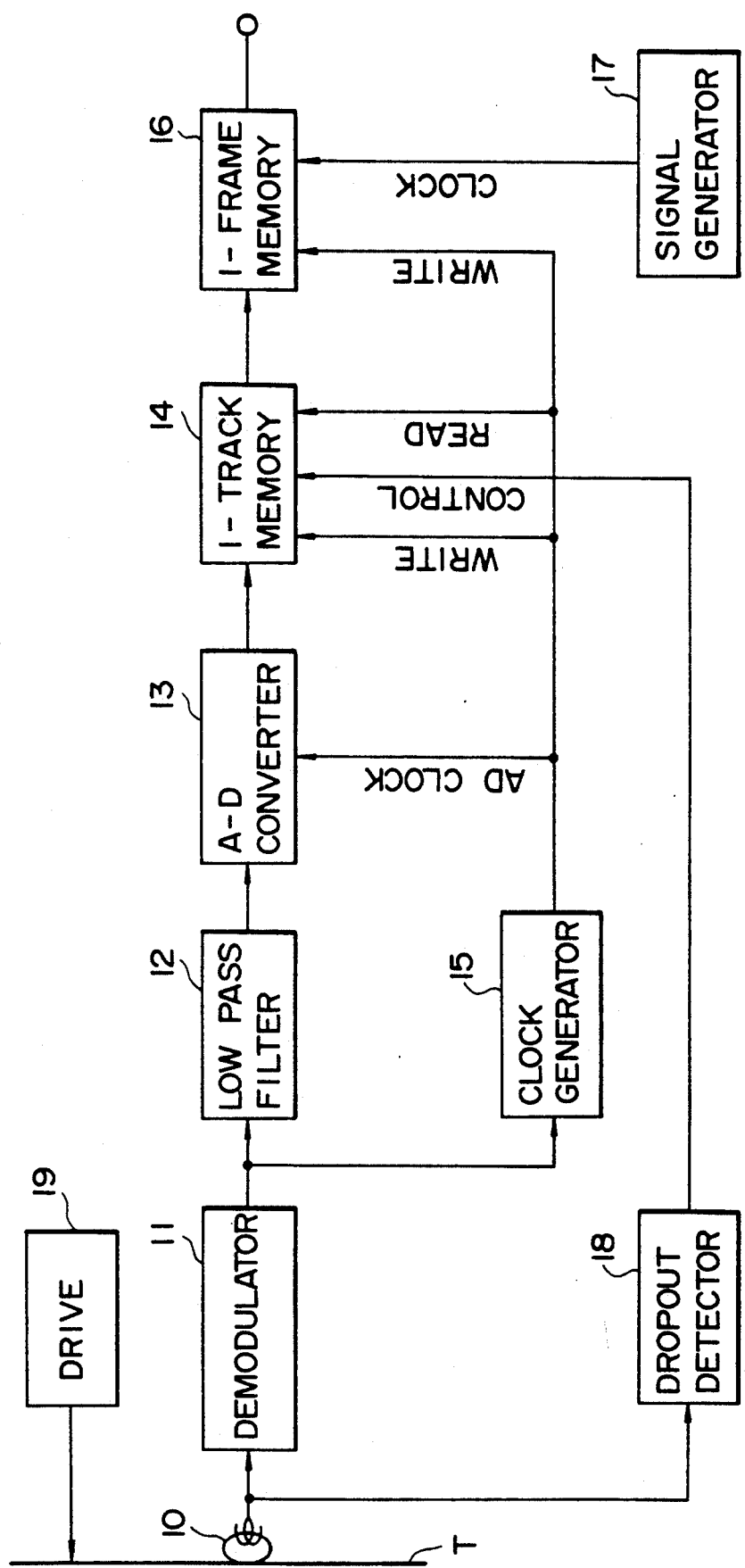

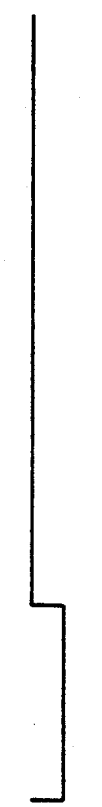
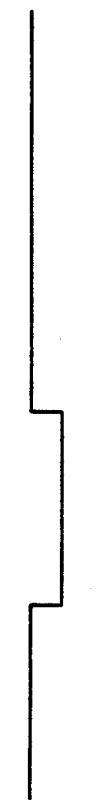
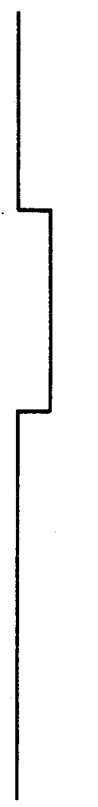
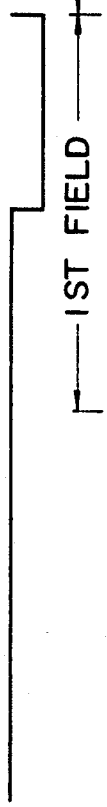
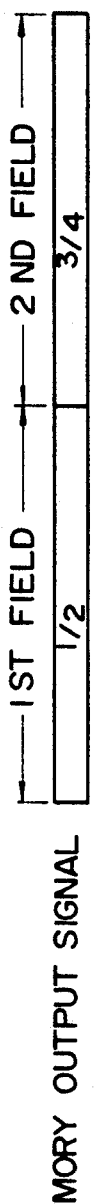
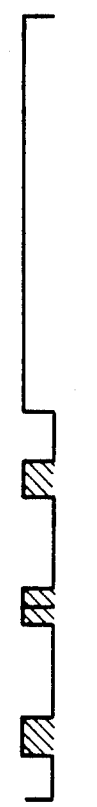
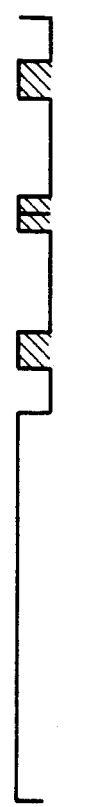
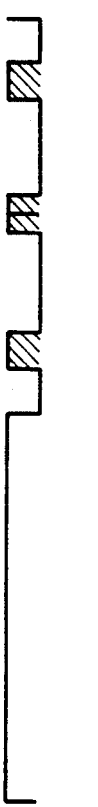
FIG. 7(a) PLAYBACK SIGNAL
FIG. 7(b) WRITE RESET/ENABLE SIGNAL
FIG. 7(c) WRITE RESET/ENABLE SIGNAL
FIG. 7(d) WRITE RESET/ENABLE SIGNAL
FIG. 7(e) WRITE RESET/ENABLE SIGNAL
FIG. 7(f) FRAME MEMORY OUTPUT SIGNAL
FIG. 7(g) WRITE RESET/ENABLE SIGNAL
FIG. 7(h) WRITE RESET/ENABLE SIGNAL
FIG. 7(i) WRITE RESET/ENABLE SIGNAL
FIG. 7(j) WRITE RESET/ENABLE SIGNAL
FIG. 7(k) FRAME MEMORY OUTPUT SIGNAL

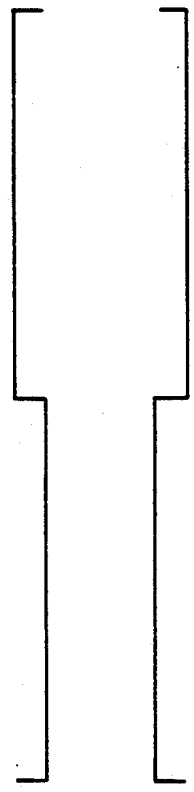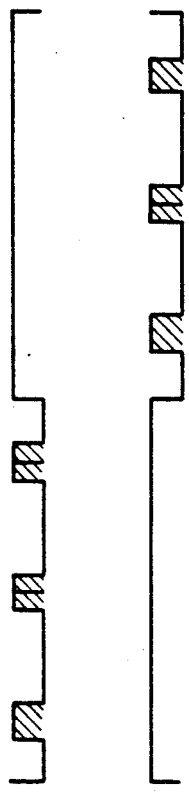
FIG.9(a) PLAYBACK SIGNAL
FIG.9(b) WRITE RESET / ENABLE SIGNAL
FIG.9(c) WRITE RESET / ENABLE SIGNAL
FIG.9(d) FRAME MEMORY SIGNAL
FIG.9(e) WRITE RESET / ENABLE SIGNAL
FIG.9(f) WRITE RESET / ENABLE SIGNAL
FIG.9(g) FRAME MEMORY OUTPUT SIGNAL

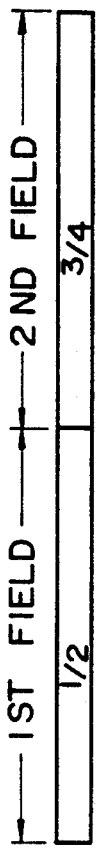
FIG. 10(a) PLAYBACK SIGNAL
FIG. 10(b) WRITE RESET / ENABLE SIGNAL
FIG. 10(c) FRAME MEMORY OUTPUT SIGNAL
FIG. 10(d) WRITE RESET / ENABLE SIGNAL
FIG. 10(e) FRAME MEMORY OUTPUT SIGNAL

FIG.11(a)

| | |
|---|---|
| N, | (N) |
| N, | N+1 |
| (N−1), | N+1 |
| N, | N+1 |
| N, | (N) |
| N, | N+2 |
| (N−1), | N+2 |

FIG.11(b)

| | |
|---|---|
| N+2, | (N+2) |
| N+2, | N+4 |
| (N+1), | N+4 |
| N+3, | N+4 |
| N+3, | (N+3) |
| N+3, | N+4 |
| (N+2), | N+4 |

FIG.11(c)

| | |
|---|---|
| (N), | (N) |
| N+1, | N+1 |
| (N), | (N) |
| N+2, | N+2 |

FIG.11(d)

| | |
|---|---|
| (N+2), | (N+2) |
| N+4, | N+4 |
| (N+3), | (N+3) |
| N+4, | N+4 |

FIG.11(e)

| | |
|---|---|
| (N), | (N) |
| N+1, | N+1 |
| (N), | (N) |
| N+2, | N+2 |

FIG.11(f)

| | |
|---|---|
| (N), | (N) |
| N+1, | N+1 |
| (N), | (N) |
| N+2, | N+2 |

A B A B A B A B A 1　2

1 FIELD

A B A B A B A B A B A 1　2

1 FIELD

VIDEO SIGNAL REPRODUCING APPARATUS

BACKGROUND OF THE INVENTION

1. Field of the Invention

The present invention relates to a video signal reproducing apparatus adapted for use in a video tape recorder (VTR) for playback of high-definition television signals or the like having a large amount of recording information.

2. Description of the Prior Art

Technical development is in progress with respect to a novel video transmission system termed high-definition television which is capable of displaying a video image with a high resolution. In such high-definition television system, where a video signal bandwidth is much wider than that in a standard transmission system based on the NTSC format or the like, it has been proposed to perform signal transmission through compression of the bandwidth by a specific method. One of the known methods for such bandwidth compression is termed MUSE (multiple sub-nyquist sampling encoding).

When a high-definition television signal is recorded by the use of a VTR or the like, the recording band can be narrowed by directly recording, without demodulation, the video signal band-compressed by the MUSE (hereinafter referred to as MUSE signal), so that an advantage is achievable in simplifying the constitution of a recording apparatus.

In a VTR for recording and reproducing such MUSE signal, there has been proposed a segment recording process which forms an image of one field by using a plurality of signal tracks. The MUSE signal has a narrower bandwidth but is approximately twice as wide as a conventional television signal based on the NTSC format and so forth. Therefore, when MUSE signals are recorded on a magnetic tape 101 as shown in FIG. 12 by means of two magnetic heads 100A and 100B which are mounted on a rotary head drum 100 with mutually different azimuths, there may be contrived an operation of, as shown in FIG. 13, first recording upper-half horizontal line signals of one field image on an azimuth-A track 102A by the magnetic head 100A having an azimuth A, and then recording lower-half horizontal line signals of one field image on an azimuth-B track 102B by the magnetic head 100B having an azimuth B.

According to such operation, each field is divided into two segments, with each segment recorded in two tracks. A segment recording operation records the upper half of one field on the track formed by the magnetic head 100A and records the lower half of one field on the track formed by the magnetic head 100B, hence increasing the available recording area per field to thereby compensate for the wide signal band.

It is customary in a VTR to provide a fast-forward playback mode or a rewind playback mode for moving a magnetic tape in a forward or reverse direction at a speed higher than a standard speed. In such fast-forward or rewind playback operation, however, noise bars are generated in a reproduced image since the magnetic heads 100A and 100B scan tracks recorded at mutually different azimuths.

The loci of the magnetic heads are oblique, as represented by thick lines in FIG. 14(a) if a double-speed playback operation is performed by the use of a magnetic head where azimuth-A tracks denoted by vertical frames A and azimuth-B tracks denoted by vertical frames B adjacent to the azimuth-A tracks are formed alternately. Shaded portions of the tracks can be reproduced when the azimuth-A magnetic head is scanning an azimuth-A track during its scan of a thick-frame locus HA and when the azimuth-B magnetic head is scanning an azimuth-B track during its scan of a thick-frame locus HB.

However, when the magnetic heads are scanning tracks formed with mutually different azimuths, the recorded signals are not reproduced at sufficiently high levels in the blank (unshaded) portions due to the difference between the head and track azimuths, hence causing noise bars in the reproduced image.

FIG. 14(a) illustrates a result of reproducing fields of a 2-channel 3-segment composition at a double speed; FIG. 14(b) illustrates a result of reproducing fields of a 2-channel 3-segment composition at a triple speed; FIG. 14(c) illustrates a result of reproducing fields of a 2-channel 2-segment composition at a double speed; and FIG. 14(d) illustrates a result of reproducing fields of a 2-channel 2-segment composition at a triple speed. It is found from such examples that the number of noise bars increases in accordance with an increase in the playback speed.

The above problem may be addressed by eliminating the portions of the signals with noise bars. However, in regard to the tracks formed with the same azimuth, noise bars appear at the same positions in the individual tracks as is obvious from the examples illustrated, so that the above method of eliminating the track portions with noise bars fails to accurately reproduce the signals of such portions, thereby deteriorating the quality of the reproduced image.

OBJECTS AND SUMMARY OF THE INVENTION

It is an object of the present invention to provide an improved video signal reproducing apparatus which is capable of eliminating noise bars from a reproduced signal in a playback operation.

Another high speed object of the present invention is to provide an apparatus of a simplified construction capable of performing a high speed search without noise bars in a reproduced signal.

According to one aspect of the present invention, there is provided a video signal reproducing apparatus for high speed playback of a recording medium having a shuffled video signal of one field thereon recorded in a plurality of tracks, said shuffled video signal having mutually adjacent lines of an image of the one field recorded on different tracks in a predetermined sequence. The apparatus comprises playback means for generating a reproduced signal by playing back the recording medium at a high speed used in a high speed playback mode and which is an integer plus ½ times a standard speed used in a standard speed playback mode; memory means for storing the reproduced signal in response to a control signal; detector means for detecting a noise bar in the reproducing signal and for generating the control signal to inhibit writing of the reproduced signal in the memory means and readout control means for controlling readout of the reproduced signal from the memory means so as to produce a deshuffled video signal having the same deshuffled sequence which is the inverse of the predetermined sequence in the high speed playback mode and in the standard-speed playback mode. When the recording medium with the video signal of one field shuffled on a plurality of tracks is played back at a high (N+½)-fold speed, noise bars appear at different positions on mutually adjacent tracks having the same azimuth. The signal corresponding to the noise bar portion is replaced with the signal obtained from the preceding same-azimuth track. These signals devoid of noise bars are deshuffled by the same deshuffling sequence as used in the standard-speed playback mode to obtain a reproduced image devoid of any noise bar.

According to another aspect of the present invention, there is provided a video signal reproducing apparatus for high speed playback of a recording medium generating a reproduced signal by playback means for fast playing back the recording medium at a high speed which is an integer plus ½ times a standard speed; memory means for storing the reproduced means signal in response to a control signal detector means for detecting a noise bar in the reproduced signal and for generating the control signal to inhibit the writing of the reproduced signal in the memory means in response to detecting of the noise bar; and control means for controlling writing of the reproduced signal in the memory means and reading out from the memory means so as to produce a deshuffled video signal which a plurality in each field are composed of a same portion of the reproduced signal. Due to such contrivance, a high speed search can be executed without the disadvantage of complicating the construction of the apparatus while a motion image can be watched with ease.

The above and other features and advantages of the present invention will become apparent from the following description which will be given with reference to the illustrative accompanying drawings.

BRIEF DESCRIPTION OF THE DRAWINGS

FIGS. 3(a)-3(e), when read together, are a timing chart of signals obtained during a high speed playback mode in an apparatus with a 1-track memory and a 1-frame memory;

FIG. 6 is a block diagram of a video signal reproducing apparatus embodying the present invention;

FIGS. 7(a)-7(k), when read together, are a timing chart of signals obtained in a high speed playback mode executed in an apparatus with a 1-frame memory capacity provided by four 1-track memories;

FIGS. 9(a)-9(g), when read together, are a timing chart of signals obtained during a playback mode in an apparatus with a 1-frame memory capacity provided by two 1-field memories;

FIGS. 10(a)-10(e), when read together, are a timing chart of signals obtained during a playback mode in an apparatus with a single 1-frame memory;

FIGS. 11(a) through 11(f) illustrate the playback images in signal reproducing operations executed by a reproducing apparatus using a 1-track and a 1-frame memory, either four 1-track or two 1-field memories, and a 1-frame memory, respectively;

DESCRIPTION OF THE PREFERRED EMBODIMENTS

Hereinafter exemplary embodiments of the present invention will be described in detail with reference to the accompanying drawings.

Figure 2:
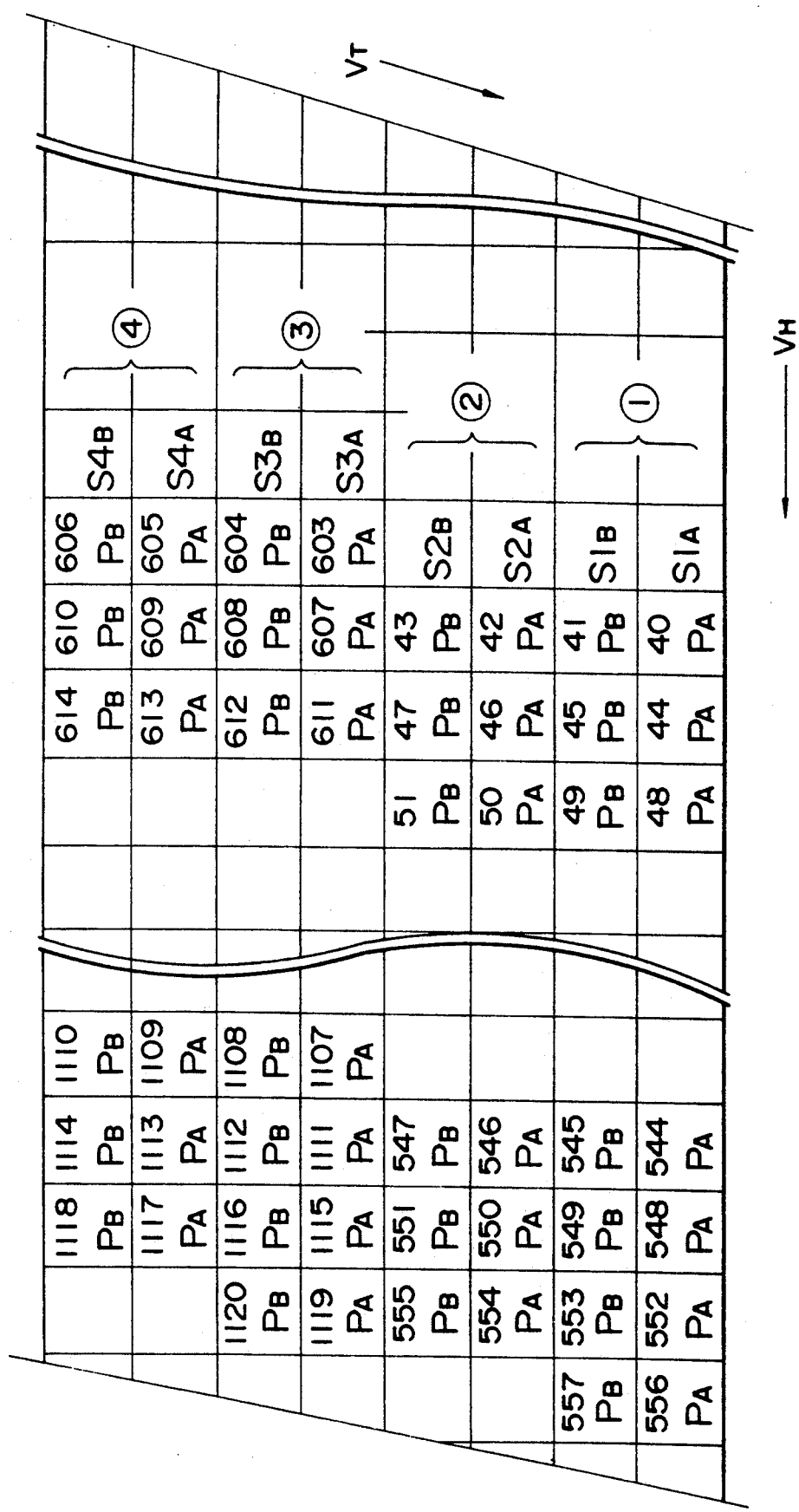
FIG. 2 shows an exemplary recorded sequence of shuffled data.

FIG. 2 shows a tape format where data has been shuffled every field under the condition that one field is composed of 2 segments each of which comprises two channels or tracks (i.e., one frame is composed of 4 segments each of which comprises two tracks). In this diagram, arrows VH and VT indicate the direction of head motion and the direction of tape motion, respectively. Numerals ①  through ④ and S1A through S4B denote the following:

① ... 1st segment
② ... 2nd segment
③ ... 3rd segment
④ ... 4th segment
S1A ... azimuth-A track in 1st segment
S1B ... azimuth-B track in 1st segment
S2A ... azimuth-A track in 2nd segment
S2B ... azimuth-B track in 2nd segment
S3A ... azimuth-A track in 3rd segment
S3B ... azimuth-B track in 3rd segment
S4A ... azimuth-A track in 4th segment
S4B ... azimuth-B track in 4th segment The example of FIG. 2 represents one frame which is constituted as follows 1st field ... consists of 1st segment and 2nd segment
2nd field ... consists of 3rd segment and 4th segment
1 frame ... consists of 1st field and 2nd field The data of the 1st field are recorded in a predetermined shuffle sequence as denoted by numerals 40, 41, 42 and so forth on an azimuth-A track S1A in the 1st segment, an azimuth-B track S1B therein, an azimuth-A track S2A in the 2nd segment, and an azimuth-B track S2B therein. Similarly the data of the 2nd field are recorded in a predetermined shuffle sequence as denoted by numerals 603, 604, 605 and so forth on an azimuth-A track S3A in the 3rd segment, an azimuth-B track S3B therein, an azimuth-A track in the 4th segment, and an azimuth-B track S4B therein.

In this embodiment, each data number represents the data corresponding to one line. More specifically, it signifies that mutually adjacent lines of the field image of the shuffled video signal are recorded on different tracks.

Suppose now that the heads for two channels (azimuth-A head and azimuth-B head) scan the tape simultaneously. Then the data 40, 44, 48, ... are reproduced sequentially from the track S1A in the first scanning, while the data 41, 45, 49, ... are reproduced sequentially from the track S1B during the same time. Thereafter the data 42, 46, 50, ... are reproduced sequentially from the track S2A in the second scanning, while the data 43, 47, 51, ... are reproduced sequentially from the track S2B during the same time. The data corresponding to one field are stored in a memory and then read out after being deshuffled into the sequence of data 40, 41, 42, . . . , whereby a normal image can be reproduced.

There exists a small possibility that data dropouts will occur successively after the deshuffling, and any dropout data can be replaced with the preceding or following data.

Figure 1:
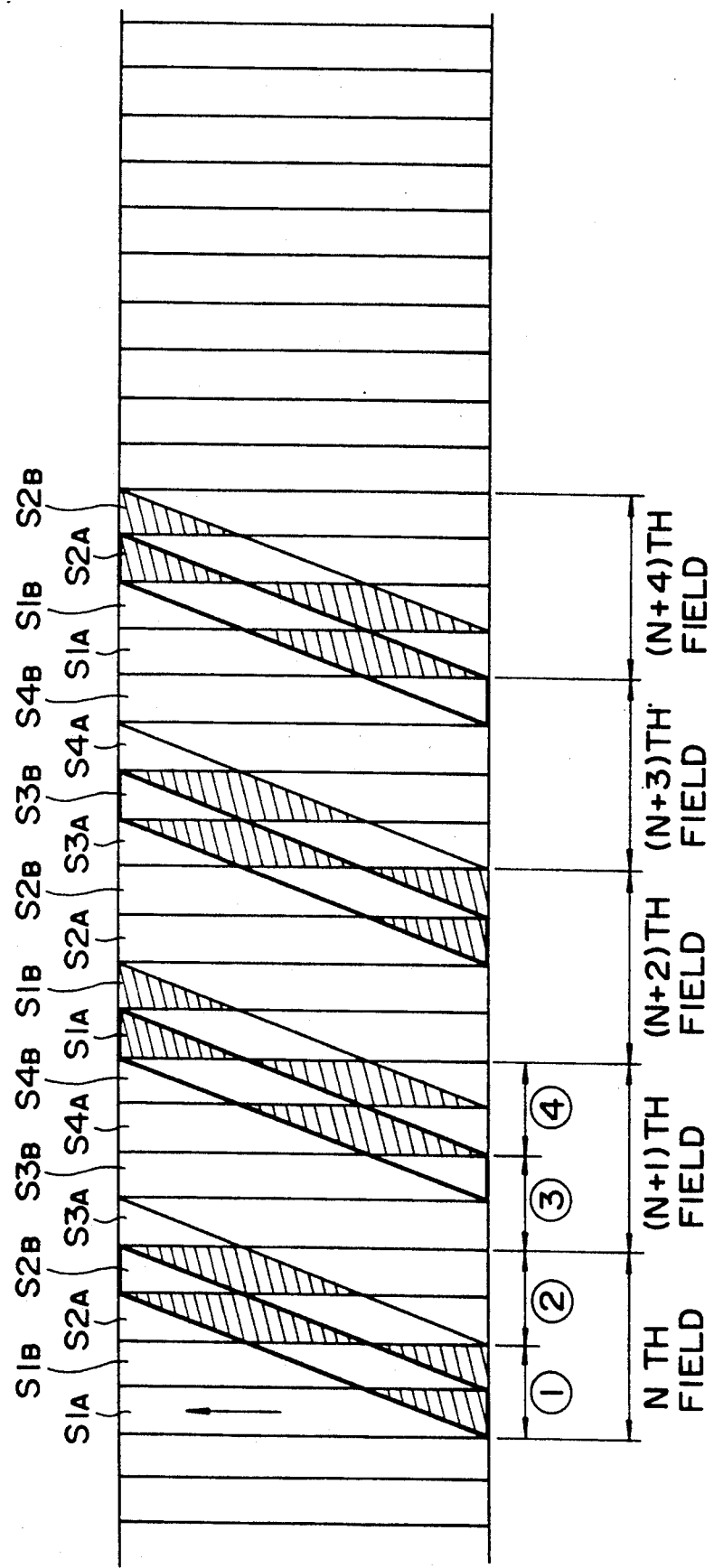
FIG. 1 illustrates motion loci (scanned tracks) of magnetic heads in a high speed playback mode.

FIG. 1 illustrates a track state obtained by playing back the recorded data tape at a high 2.5-fold speed. In a standard-speed playback mode, the head scans the vertical track S1A in the direction indicated by a vertical arrow and terminates playback of the track at its upper end in the drawing. However, when the tape is moved leftward in a high speed operation performed at a 2.5-fold speed, the head arrives at the final end of the track S2B instead of the upper end of the track S1A. Consequently the scanning locus of the head is oblique instead of vertical as shown in FIG. 1.

As described above, one frame consists of two fields each comprising two segments. Since each segment has two channels (two tracks) with an azimuth A and an azimuth B, the tape portion represented by four pairs (eight in total) of oblique bands corresponds to the entire read area of one frame in a 2.5-fold high speed playback mode. The two pairs of the left bands constitute a 1st field, while the two pairs of the right bands constitute a 2nd field.

For example, the azimuth-A read signal is correctly obtained only from the shaded areas of the azimuth-A tracks S1A, S2A, S3A, S4A . . . and so forth. Meanwhile the blank areas other than the shaded areas are those where noise bars are caused. Such relationship exists with respect to the azimuth-B tracks as well. Therefore, if the noise-bar areas are replaced with the signal read out normally, it becomes possible to eliminate the noise bars. For the purpose of achieving such elimination, the data of the noise-bar areas are replaced with the data of the preceding same-azimuth track.

The data used for such replacement are that of the area corresponding, in the preceding track, to the position where the noise bar appears in the current track. Such data replacement can be realized by performing a playback operation at an $(N+\frac{1}{2})$-fold high speed (where N is a positive or negative integer) higher than a recording or standard speed. In any portion spaced apart by several tracks or so, there exists a low probability that the content of the image drastically changes. Therefore, despite replacement with the data read out from the preceding track, the resultant image is substantially free from incongruous visual appearance.

FIGS. 3(a)–3(e), when read together, are a timing chart of the memory control signals and the video signals in an exemplary case where a high speed search devoid of noise bars is executed at a 2.5-fold high speed (N=2) using a 1-track per head ($\frac{1}{2}$ field) memory and a 1-frame memory (i.e., a $\frac{1}{2}$-field memory and a 1-field memory per each of two channels). In this chart, there are shown the data of only one channel for the sake of convenience.

Figure 4:
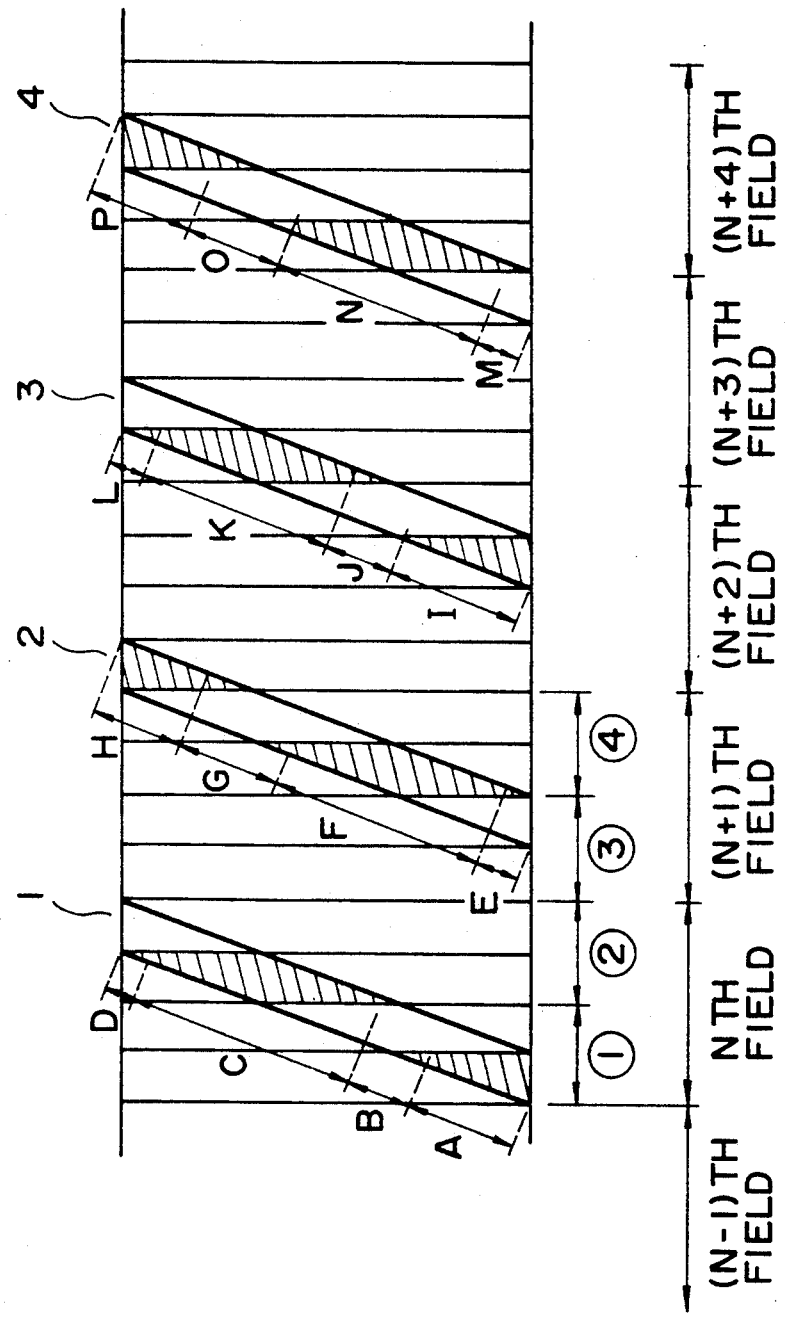
FIG. 4 is an excerpt of FIG. 1 used in explaining the playback operation shown in FIGS. 3(a)-3(e)

In FIG. 3(a), a playback signal is shown with numerals 1 through 4 which are enclosed within frames and denote the oblique scanning loci of the heads across the tape (tracks or segments in a high speed playback operation). FIG. 4 illustrates the extraction of a thick-line portion (one channel) in FIG. 1. More specifically, the numerals 1 through 4 in the frames denote a 1st scanning track, a 2nd scanning track, a 3rd scanning track and a 4th scanning track, respectively.

The playback signal is written in a memory having a 1-track storage capacity. In FIG. 3(b), the shaded portion represents a high-level duration corresponding to a noise bar area, and the operation of writing the signal in the 1-track memory is inhibited during such high-level time. The writing operation is executed during the low-level time in FIG. 3(b).

FIG. 3(c) shows the output signal from the 1-track memory, in which numerals 1 through 4 denote the tracks corresponding to those in FIG. 3(a) and FIG. 4 respectively. And reference symbols (A) through (P) denote the signals read out from the portions A through P shown in FIG. 4.

In FIG. 3(c), blank portions enclosed with thick frames represent the data read out normally from the corresponding azimuth tracks (recording tracks). Meanwhile each of the shaded portions represents the period during which the operation of writing the signal in the 1-track memory is inhibited in FIG. 3(b) so that the data used for such period is the data read out from the preceding track.

In further detail, the individual data are composed as follows.

Reference numeral 1(A) denotes the data read out normally from the shaded portion A of the Nth field in FIG. 4.

Reference numeral 4(B) denotes a noise-bar area B in the Nth field shown in FIG. 4. Since the data read out from the Nth field is inhibited from being written in the 1-track memory during this period, the data obtained from the corresponding portion of the (N−1)th field which was recorded in the 1-track memory at the preceding scanning time is used as the data for area B.

Reference numeral 1(C) denotes the data read out normally from the shaded portion C of the Nth field in FIG. 4.

Reference numeral 4(D) denotes a noise-bar area corresponding to the blank portion D of the Nth field in FIG. 4. During this period, the data read out from the Nth field is inhibited from being written in the 1-track memory, and so that the data obtained from the corresponding portion of the (N−1)th field which was recorded at the preceding scanning time is used as the data for area D.

The data of the 2nd track is composed as follows.

Reference numeral 1(E) denotes a noise-bar area corresponding to the blank portion E of the (N+1)th field in FIG. 4. Since the data writing is inhibited during this period, the data obtained from the area (A) of the Nth field at the preceding scanning time is used as the data for area E.

Reference numeral 2(F) denotes the data read out normally from the shaded portion F of the (N+1)th field in FIG. 4.

Reference numeral 1(G) denotes a noise-bar area corresponding to the blank portion G of the (N+1)th field in FIG. 4. Since the data writing is inhibited during this period, the data obtained from the area C of the Nth field at the preceding scanning time is used as the data for area G.

Reference numeral 2(H) denotes the data read out normally from the shaded portion H of the (N+2)th field in FIG. 4.

With regard to the 3rd and 4th tracks, each portion read out normally from the scanned track is also represented by a thick frame, and each shaded portion also corresponds to a noise-bar area replaced with data of the preceding track.

FIG. 3(d) shows a write reset/enable signal; data is written in the 1-frame memory when the level of this signal is low. FIG. 3(e) shows an output signal of the 1-frame memory, in which the data of the 1st track and that of the 2nd track are deshuffled so that the respective data are outputted line by line alternately. Similarly with regard to the 3rd and 4th tracks, the data are deshuffled in the same manner. Furthermore, as described above, deshuffling is performed in relation to the other channel as well.

Figures 5A, 5B, 5C, 5D, 5E, 5F, 5G, 5H, 5I, 5J, 5K:
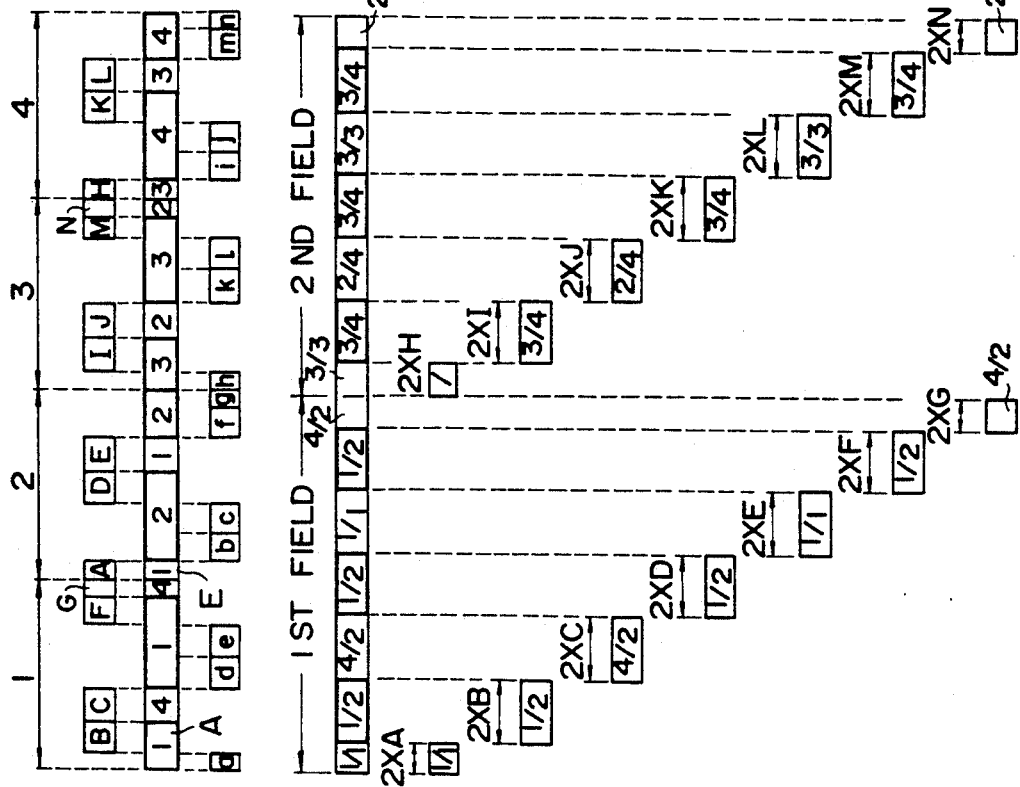
FIGS. 5(a)-5(k) depict deshuffling operation performed during the playback operation shown in FIGS. 3(a)-3(e)

FIGS. 5(a)–5(k) illustrate a deshuffling operation where the signal of FIG. 3(e) is outputted. FIG. 5(b) shows the output signal of the 1-track memory in FIG. 3(c) with the exception of the shaded portion thereof. Meanwhile in FIG. 5(d), there is shown the output signal of the 1-frame memory in FIG. 3(e) with the exception of the shaded portions thereof.

In the 1st field of FIG. 5(d), the data of the 1st track and that of the 2nd track are readout alternately from the output of the 1-track memory which has been stored in the 1-frame memory, in response to a readout control signal, as follows. First pair of readout data:

The portion A of the 1st track and the portion E of the 2nd track are read alternately from the respective top lines. The portion A of the 1st track enclosed with a thick-line frame represents the data read normally from a track, but the portion, E of the 2nd track represents the data replaced with the data of the previously read track. Such data are read alternately line by line according to the inverse of the predetermined sequence used for recording and shown in FIG. 2. The first reading is terminated upon completion of reading the entire portion E. Since the data length (number of lines) after such complete reading is determined by the length of the shorter data (number of lines) and becomes a double thereof, a length of the shorter data is denoted by capital letters in FIGS. 5(a) and 5(c), while a length of the longer data is denoted by small letters.

Therefore the data of the length A shown in FIG. 5(a) is read from the 2nd track, and the data included in the portion A shown in FIG. 5(b) of the 1st track and having a length equal to the length A shown in FIG. 5(a) i.e., the data a shown in FIG. 5(c), is read from the 1st track.

Consequently the length of the first read data becomes twice the length A shown in FIG. 5(a) (which is also twice the length (a) in FIG. 5(c)). The data read from the 1st track during this period was obtained therefrom directly, while the data read from the 2nd track was replaced with the data of the 1st track. Accordingly, during this period, the data originally of the 1st track is readout from tracks 1 and 2 of FIG. 5(b), and therefore such data are denoted as 1/1 in FIG. 5(d), in which a thin-line frame signifies that replaced data is included therein. Second pair of readout data:

Since the data obtained by the first reading is composed of the portion a of the 1st track shown in FIG. 5(c) and the portion A of the 2nd track shown in FIG. 5(a), the second read data is composed of the portions directly following the same. More specifically, the following portions are the portion B of the 1st track in FIG. 5(a) (the portion not yet read out of the data A of FIG. 5(b)) and the portion b of the 2nd track in FIG. 5(c) equal in length to the portion B of the 1st track in FIG. 5(a). The data obtained during this period were read normally from both the 1st and 2nd tracks, and are therefore enclosed with thick-line frames in FIG. 5(d). A left numeral 1 of ½ in FIG. 5(d) denotes the 1st track, while a right numeral 2 thereof denotes the 2nd track. Third pair of readout data:

Since the data obtained by the second reading is composed of the portion B of the 1st track shown in FIG. 5(a) and the portion b of the 2nd track shown in FIG. 5(c), the third read data is composed of the portions directly following the same. More specifically, the following portions are the portion C of the 1st track in FIG. 5(a) and the portion c of the 2nd track in FIG. 5(c). The data of the 1st track was replaced with data read from the 4th track at the preceding scanning time, and the data of the 2nd track was read normally therefrom. Accordingly such data are expressed as 4/2 in FIG. 5(d), where a left numeral 4 denotes the data read from the 4th track, while a right numeral 2 denotes the data read from the 2nd track, and they are enclosed with a thin-line frame as one of them is replaced data.

Thereafter the data are sequentially read out in the same manner as above so that, as shown in FIG. 5(d), the data of the 1st and 2nd tracks are alternately readout and deshuffled. Meanwhile the data of the 3rd and 4th tracks are also alternately readout and deshuffled in the same manner.

FIG. 6 is a block diagram of an apparatus constructed to perform such reading operation. A magnetic tape T is moved by a drive 19 (playback means) at a (N+½)-fold high speed in comparison with a standard playback (or recording) speed. The data read as a reproduced signal by a playback head 10 (playback means) is demodulated by a demodulator 11 and then is supplied via a low-pass filter 12 to an A-D (analog-to-digital) converter 13, where the data is converted to a digital signal in synchronism with a clock signal supplied from a clock generator 15. The clock generator 15 serves to produce a clock signal based on the output of the demodulator 11. The digital signal is written in a 1-track memory 14 (memory means) synchronously with the clock signal supplied from the clock generator 15. In response to detection of any noise bar by a dropout detector 18 (detection means), a control signal is generated so that the data from the reproduced signal is inhibited from being written in the 1-track memory 14. In reproducing the data from a different-azimuth track, the playback level of the RF signal is lowered as is the case with occurrence of any dropout, so that a noise bar can be detected similarly to such dropout. The data written in the 1-track memory 14 is transferred to a 1-frame memory 16 (memory means) synchronously with the clock signal. The data thus written in the 1-frame memory 16 is deshuffled and readout in accordance with a clock signal supplied from a signal generator 17 (readout control means).

More specifically, the data reading operation (deshuffling) relative to the 1-frame memory 16 is performed by the same inverse of the predetermined sequence used to shuffle the data in the high speed playback mode as in the standard-speed playback mode, and there is no necessity of executing any address control or the like different from that in the standard-speed playback mode. In this embodiment, therefore, the same timing control as in the standard playback mode can be executed in the high speed playback mode to consequently simplify the control action.

FIGS. 7(a)–7(k), when read together, are a timing chart of signals produced to perform a high speed search devoid of noise bars in an embodiment of the present invention with a storage capacity of 1-frame using four 1-track memories per head. FIGS. 7(b)

through 7(f) relate to the standard playback mode, wherein, in a standard-speed playback operation, the signals of four tracks are written respectively in a four-phase memory (four 1-track memories) and, after completion of writing the data of one field, deshuffled signals are read out therefrom.

FIGS. 7(g) through 7(k) relate to the high speed playback mode, wherein the 1st track memory is once reset after completion of writing the data of the 1st track, and then the data of the 2nd track is overwritten in the same address. The 2nd track memory is used in the same manner as the 1st track memory. The 3rd track memory is once reset after completion of writing the data of the 3rd track, and then the data of the 4th track is overwritten in the same address. The 4th track memory is used in the same manner as the 3rd track memory. An example concerned with the 1st track memory is shown in FIG. 7(g). Initially the data of the 1st track is written during a time period T1, and then the data of the 2nd track is overwritten in the same locations during a time period T2.

In FIGS. 7(g)-7(j), each shaded portion signifies a duration when writing is inhibited to eliminate a noise bar. Therefore, in the unshaded portion, overwriting is performed during the period T2 of FIGS. 7(g) and 7(h) on the data written during the period T1 but, in the shaded portion, overwriting is not executed during the period T2. Consequently, in such shaded portion, the data written during the period T1 remains unchanged. Thus, data in the shaded portion of the period T2 is replaced with the data obtained during the corresponding portion of the period T1.

The same data portion of the reproduced signal is written in the 1st and 2nd memories for the 1st field and also the same data portion of the reproduced signal is written in the 3rd and 4th memories for the 2nd field, so that when the data are alternately read from the 1st memory for the 1st track and the 2nd memory for the 2nd track or from the 3rd memory for the 3rd track and the 4th memory for the 4th track and then are deshuffled, the result is such that the same line is read twice to replace the data, as shown in FIG. 7(k).

Figure 8:
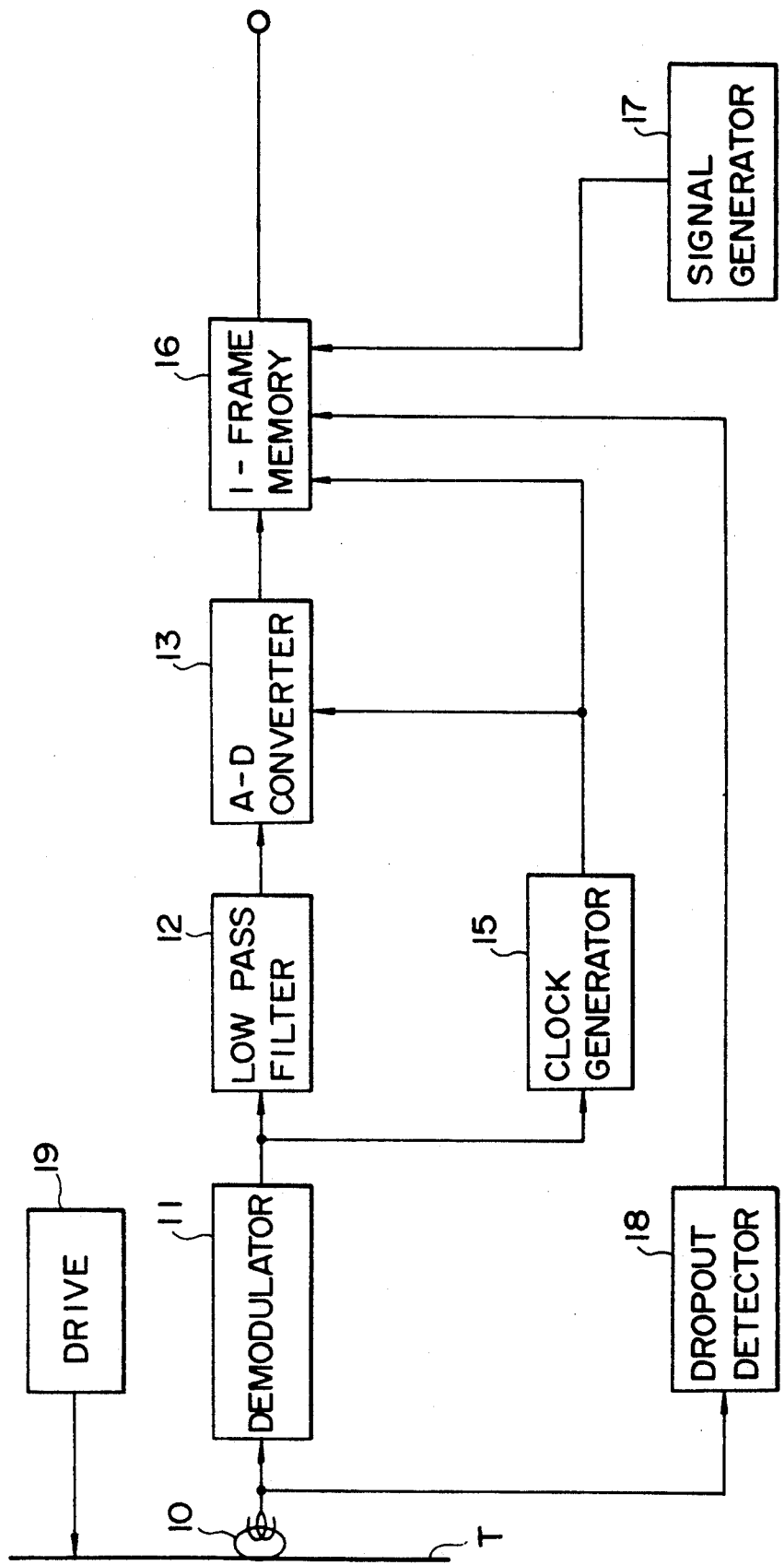
FIG. 8 is a block diagram of a video signal reproducing apparatus representing another embodiment of the present invention.
Figure 12:
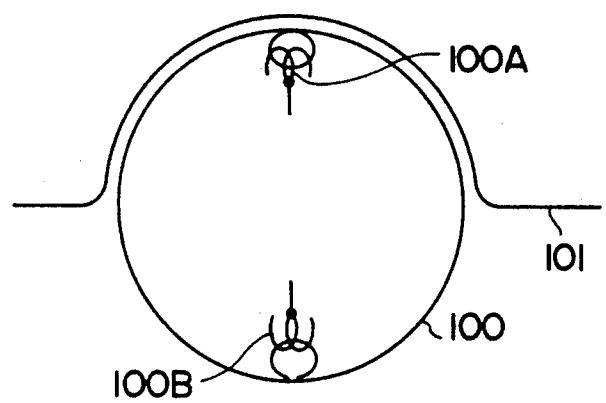
FIG. 12 illustrates the positional relationship between heads and a tape.
Figure 13:
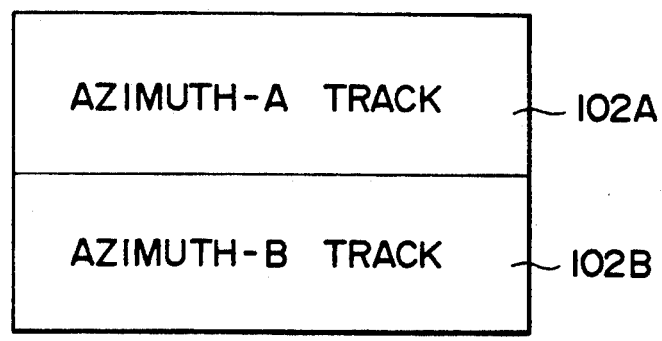
FIG. 13 illustrates tracks reproduced by the heads shown in FIG. 12.
Figure 14A:
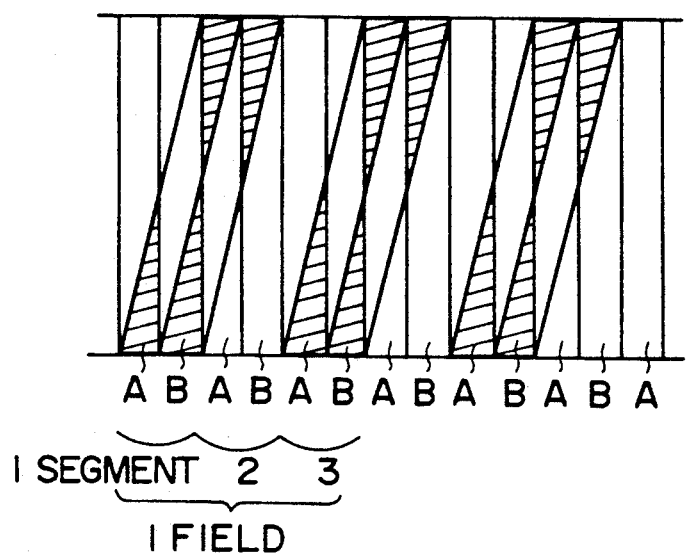
FIGS. 14(a) through 14(d) illustrate motion loci of heads and exemplary causes of noise bars in the playback operation by a conventional method.
Figure 14B:
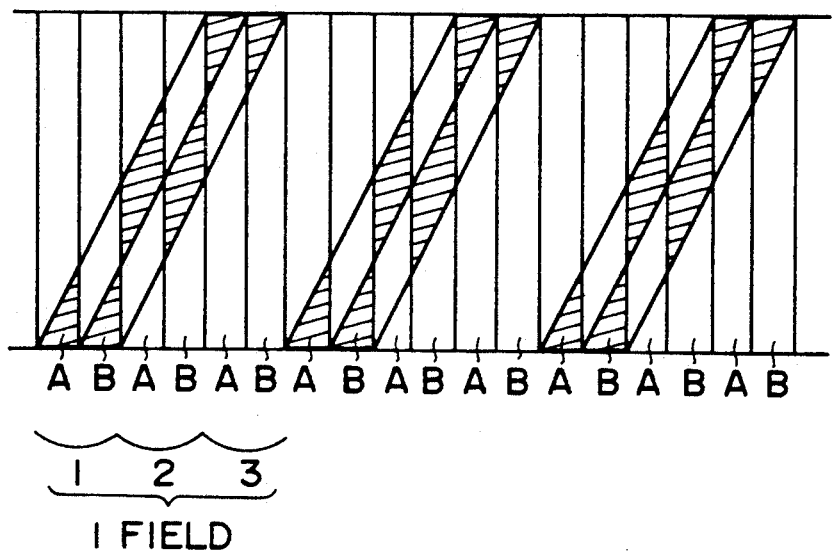
Figure 14C:
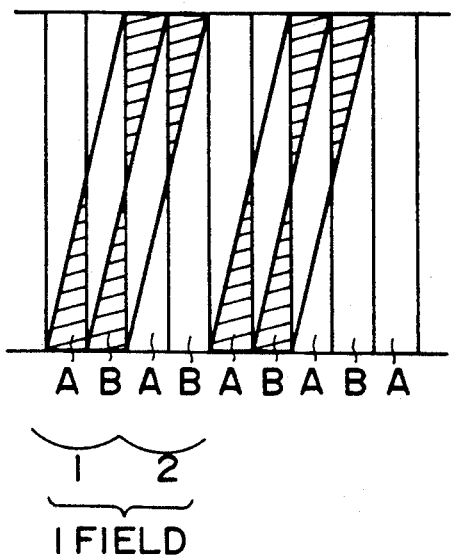
Figure 14D:
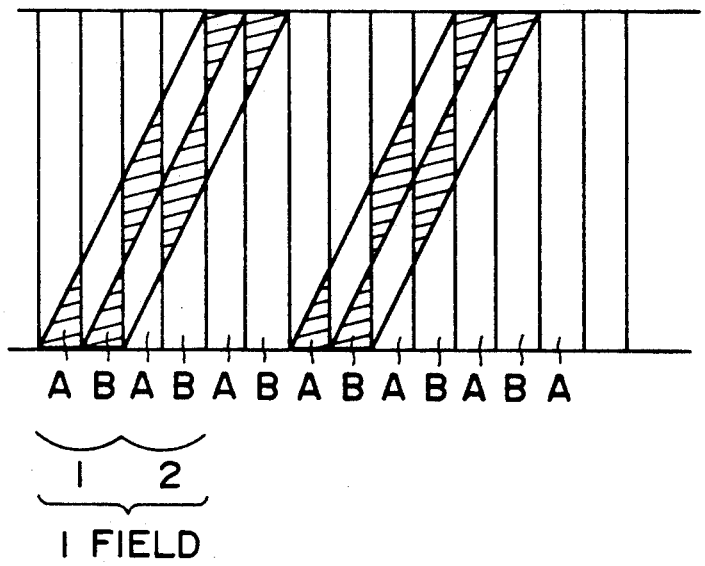

FIG. 8 is a block diagram of an apparatus for realizing such a reading operation, wherein the difference from the aforedescribed apparatus of FIG. 6 resides in that the 1-track memory 14 is omitted. In this embodiment, therefore, the memory control method in the standard playback mode needs to be different from that in the high speed playback mode as described.

FIGS. 9(a)-9(g), when read together, are a timing chart of signals in an embodiment of the present invention using two 1-field memories (two 2-phase or 2-track memories), in which FIGS. 9(b) through 9(d) relate to the standard playback mode. The 2-phase memories are divided in use for the 1st field and the 2nd field. More specifically, the data of the 1st and 2nd tracks are written in different addresses of the 1st field memory, and the data of the 3rd and 4th tracks are written in different addresses of the 2nd field memory, as shown in FIGS. 9(b) and 9(c). The data read out therefrom are deshuffled field-by-field as shown in FIG. 9(d).

FIGS. 9(e) through 9(g) relate to the high speed playback mode. In this operation also, the data of the 1st field and that of the 2nd field are written in the individual memories. In every field, each memory is reset for writing per track, and then the data of one track is written twice (overwritten) in the same address location. Meanwhile in a reading operation, the data in the same address (i.e., the data of the same line) is read twice to be deshuffled, so that an output signal similar to that of FIG. 7(k) FIG. 7(k) is obtained.

This embodiment is fundamentally so composed as shown in FIG. 8, wherein the 1-frame memory 16 is controlled by the signal generator 17 in such a manner that, in a standard speed playback mode, the data of one line is read out alternately from the 1st-track address and the 2nd-track address in the 1st field memory constituting part of the 1-frame memory 16. Such control action is executed similarly with respect to the 2nd field memory. However, in a high speed playback mode, the signal generator 17 supplies address information to the 1-frame memory 16 in addition to the clock signal so that the data of one track is written twice in the same address, and the data of one track is read out twice from the same address.

FIGS. 10(a)-10(e), when read together are a timing chart of signals in another embodiment of the present invention where the 1-frame memory 16 in FIG. 8 is composed of a single-phase 1-frame memory. FIGS. 10(b) and 10(c) relate to a standard speed playback mode, and FIGS. 10(d) and 10(e) to a high speed playback mode, respectively.

During the standard speed playback mode, the data of the 1st through 4th tracks are sequentially written in mutually different addresses to the 1-frame memory in response to a control signal from the signal generator 17, and deshuffling the data is started upon complete storage of the data corresponding to one field.

Meanwhile during the high speed playback mode, the memory is reset for writing per track in the 1st field, and the 2nd track data is written over the 1st track data, but the 2nd field data (3rd and 4th track data) is not written. In the reading operation, the same line is read twice for deshuffling the data. In this embodiment, the same image as that of the 1st field is repeatedly outputted in the 2nd field, so that the data of the same line is read four times.

Thus, three kinds of images can be obtained by using the four kinds of memory constructions as described. FIGS. 11(a)-11(f) illustrate how the respective output signals are reproduced on a practical monitor screen. In this diagram, reference symbols N−1 through N+4 denote fields of FIG. 4, and parentheses signify replaced data. FIGS. 11(a) and 11(b) show the 1st and 2nd fields, respectively reproduced by using a 1-track memory and a 1-frame memory, and correspond to FIG. 3(e).

FIGS. 11(c) and 11(d) show the 1st and 2nd fields, respectively, reproduced four 1-track memories or two 1-field memories, and correspond to FIGS. 7(k) and 9(g).

FIGS. 11(e) and 11(f) show the 1st and 2nd fields, respectively, reproduced using a single-phase 1-frame memory, and correspond to FIG. 10E.

As is obvious from the above examples, the method of FIGS. 11(a) and 11(b) using a 1-track memory and a 1-frame memory is the best of all with respect to the resolution. This method has another advantage in that the timing control is the same in both the standard speed playback mode and the high speed playback mode. However, since signal lines having a time difference are reproduced every two lines according to this method, the image becomes striped when in relatively quick motion, so that the image is difficult to see. Meanwhile according to the method shown in FIGS. 11(c) and 11(d), the data of one track is overwritten in the same address, and the data of the same line is read out twice to be deshuffled, hence reducing the possibility that the lines of different fields exist together as compared with the example of FIGS. 11(a) and 11(b), whereby the image is easier to see. Furthermore, the method of using a single-phase 1-frame memory has an advantage in that, although the resolution is lower as shown in FIGS. 11(e) and 11(f), the distance between the lines displayed simultaneously on the image of one frame is shortened to two fields at most, so that a natural image can be observed even when there is relatively quick motion. Thus, it becomes possible to achieve a high speed search while reproducing a natural image, even one having relatively quick motion, without the necessity of any compensation by a motion vector or the like.

As described hereinabove, according to a first embodiment of the video signal reproducing apparatus, the signal portion corresponding to a noise bar is replaced with the preceding data in a playback operation performed at a (N+½)-fold high speed, so that noise bars can be prevented and the data can be deshuffled in the same manner as in a speed playback mode.

And according to another embodiment of the video signal reproducing apparatus, a plurality of data portion of the reproduced signal in each field are composed of the same lines, so that a satisfactory image that can be easily seen, even if the image is in relatively quick motion is attainable in a high speed search by a simplified construction without the necessity of any particular compensation by a motion vector or the like.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A video signal reproducing apparatus for high speed playback of a recording medium having a shuffled video signal of one field recorded thereon in a plurality of tracks, said shuffled video signal having mutually adjacent lines of an image of said one field recorded on different tracks in a predetermined sequence, said apparatus comprising:

playback means for generating a reproduced signal by playing back said recording medium at a high speed used in a high speed playback mode and which is an integer plus ½ times a standard speed used in a standard speed playback mode;

memory means including a one-track memory into which said reproduced signal is written in response to one state of a control signal and further including a one-frame memory;

detector means for detecting a noise bar in said reproduced signal and for providing another state of said control signal to inhibit writing of said reproduced signal in said one-track memory in response to detecting of said noise bar;

clock generating means for generating a clock signal based on said reproduced signal;

means applying said clock signal to said one-track memory for reading data devoid of noise bars from the latter;

means applying said clock signal to said one-frame memory for writing said data devoid of noise bars into said one-frame memory in synchronism with said reading of said data devoid of noise bars from said one-track memory; and readout control means for controlling readout of said data devoid of noise bars from said one-frame memory so as to produce a deshuffled video signal having a deshuffled sequence which is the inverse of said predetermined sequence and which is the same for the high speed playback mode and for the standard-speed playback mode.

2. A video signal reproducing apparatus according to claim 1, wherein said readout control means produces said deshuffled video signal by sequentially reading out said mutually adjacent lines of said image from predetermined locations in said one-frame memory corresponding to different tracks of said reproduced signal.

3. A video signal reproducing apparatus for high speed playback of a recording medium having a shuffled video signal recorded thereon in a plurality of tracks, said apparatus comprising:

playback means for generating a reproduced signal by playing back said recording medium at a high speed which is an integer plus ½ times a standard speed;

memory means including a one-track memory into which said reproduced signal is written in response to one state of a control signal and further including a one-frame memory;

detector means for detecting a noise bar in said reproduced signal and for providing another state of said control signal to inhibit writing of said reproduced signal in said one-track memory in response to detecting of said noise bar;

clock generating means for generating a clock signal based on said reproduced signal;

means applying said clock signal to said one-track memory for reading data devoid of noise bars from the latter;

means applying said clock signal to said one-frame memory for writing said data devoid of noise bars into said one-frame memory in synchronism with said reading of said data devoid of noise bars from said one-track memory; and control means for controlling reading out of said data devoid of noise bars from said one-frame memory so as to produce a deshuffled video signal in which a plurality of lines in each field are composed of a same portion of the reproduced signal.

4. A video signal reproducing apparatus according to claim 3, wherein said memory means includes seven additional one-track memories.

5. A video signal reproducing apparatus according to claim 3, wherein said one-frame memory includes two one-field memories.

6. A video signal reproducing apparatus according to claim 1 or 3, wherein said playback means includes a rotary drum with a plurality of magnetic heads having mutually different azimuths, and said recording medium is a magnetic tape.

* * * * *